Figure 1:
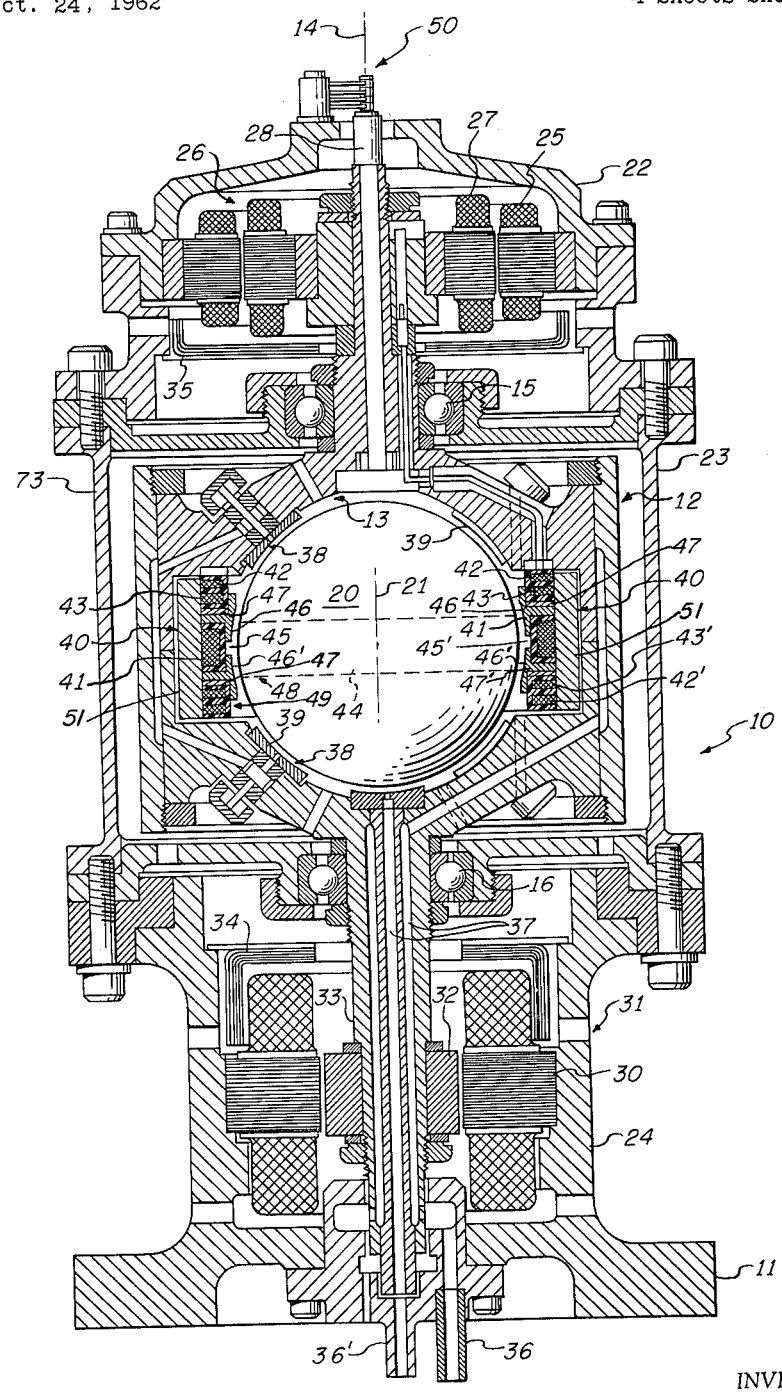

May 24, 1966  G. J. WATT  3,252,340
GYROSCOPIC APPARATUS
Filed Oct. 24, 1962  4 Sheets-Sheet 1

INVENTOR.
GORDON J. WATT
BY
H. P. Terry
ATTORNEY

INVENTOR.
GORDON J. WATT
BY
ATTORNEY

INVENTOR.
GORDON J. WATT
BY
*H.P. Ferry*
ATTORNEY

United States Patent Office 3,252,340
Patented May 24, 1966

3,252,340
GYROSCOPIC APPARATUS
Gordon J. Watt, Huntington Station, N.Y., assignor to Sperry Rand Corporation, Great Neck, N.Y., a corporation of Delaware
Filed Oct. 24, 1962, Ser. No. 232,713
13 Claims. (Cl. 74—5.46)

This invention relates to gyroscopic apparatus.

Gyroscopic apparatus having rotors or senstive elements which rotate as free elements are known as free rotor gyroscopes. Gyroscopes of this type consist of a spinning sphere rotating in a universal bearing where the bearing itself may be stationary or may rotate. Rotation of the universal bearing around an axis coincident with the normal spin axis of the rotor averages bearing torques which would otherwise cause the rotor to precess undesirably in inertial space. Misalignment of the rotation axis of the universal bearing and the spin axis of the gyroscope rotor generally coerces the rotor to precess toward the axis of rotation of the bearing because of viscous coupling therebetween. Elastic constraint causes a conical precession of the rotor around the bearing axis especially for synchronous rotation of the two. Examples of gyroscopes of this type include electrostatically supported gyroscopes, electromagnetically supported gyroscopes, cryogenic gyroscopes, and gyroscopes having a spherical rotor hydrodynamically or hydrostatically supported by means of a fluid.

For purposes of example the present invention will be disclosed with respect to a ball gyro having a spherical sensitive element which is universally suspended within a universal air bearing having a spherical cavity in which the spherical sensitive element or ball is synchronously rotated with its bearing. The universal bearing completely surrounds the spherical rotor. A fundamental problem with this and other free rotor gyroscopes is that of detecting the rotor spin axis, precisely precessing this axis to maintain a predetermined orientation, and uncoupling the rotor from its bearing as far as undesirable precessional forces are concerned.

It is an object of the present invention to provide apparatus for gyroscopes which detects the orientation of the rotor spin axis, precisely precesses the rotor spin axis to a predetermined orientation and eliminates undesirable coercive forces on the rotor.

It is another object of the present invention to provide a compact combined pick-off and torquing device which does not undesirably interact with respect to its individual components nor undesirably coerce the sensitive element of a gyroscopic apparatus and is independent of electrical supply frequency.

It is a further object of the present invention to provide a combined pick-off and torquing device including saliencies which cooperate with magnetized portions of a sensitive element thereby causing the sensitive element to spin synchronously with the rotatable bearing upon which the saliences, pick-off and torquing apparatus is mounted and to cause said magnetized portions to lie in the plane defined by said pick-off element.

These and other objects are achieved by the apparatus of the present invention which accomplishes detection, precession and uncoupling. Pick-off and torquing coils mounted for rotation with a universal rotatable bearing cooperate with common magnetized portions of a sensitive element rotatably supported within the bearing to achieve the above objects.

Figure 2:
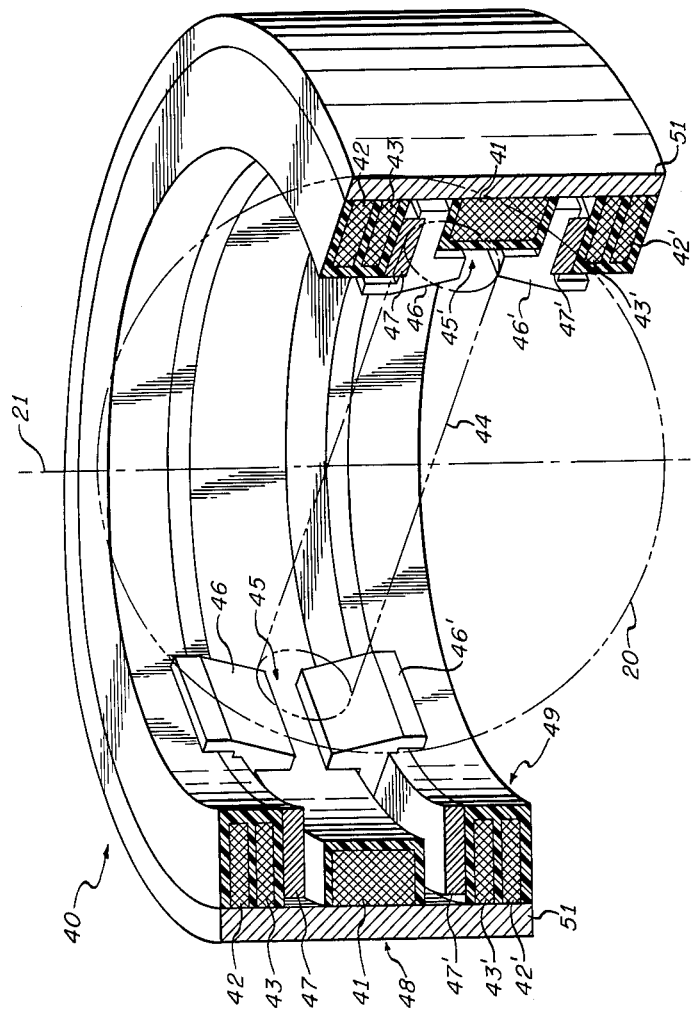
Figure 3:
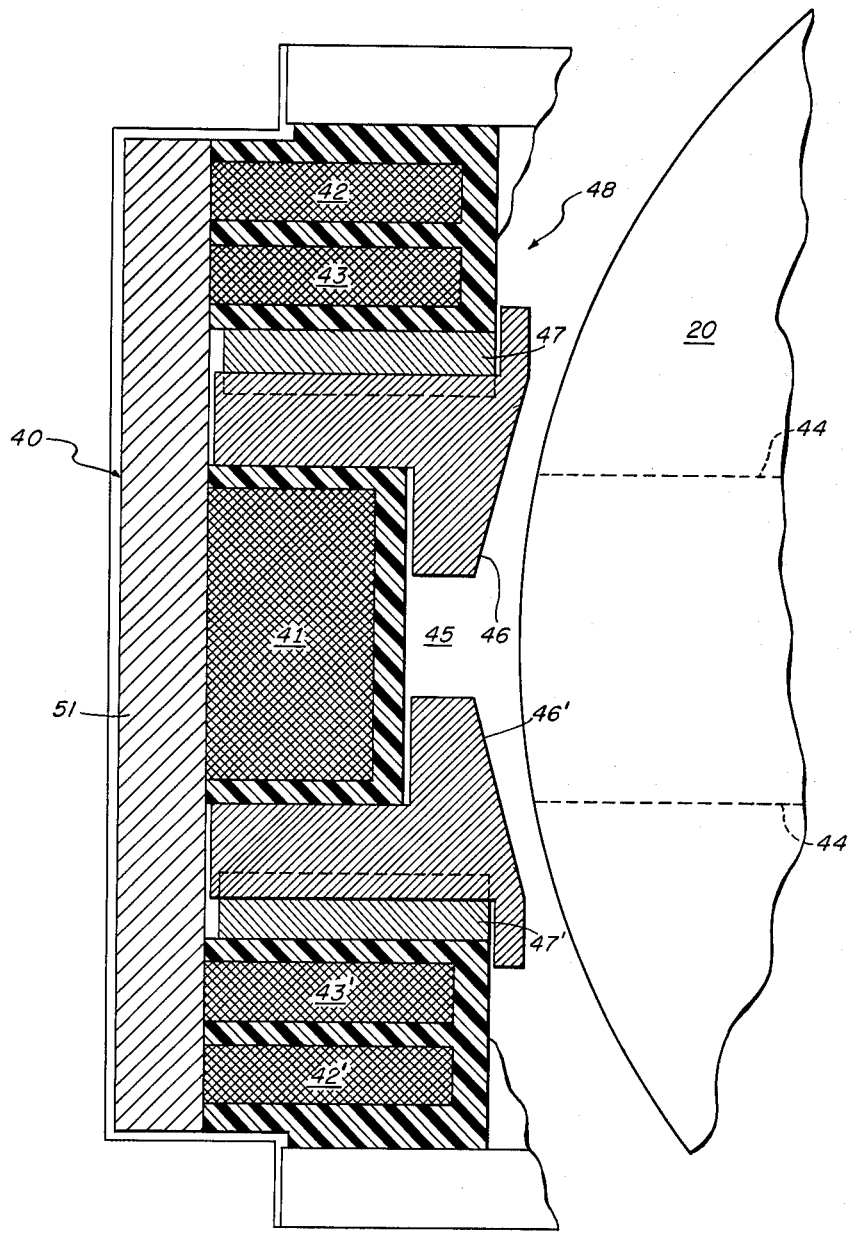
Figure 4:
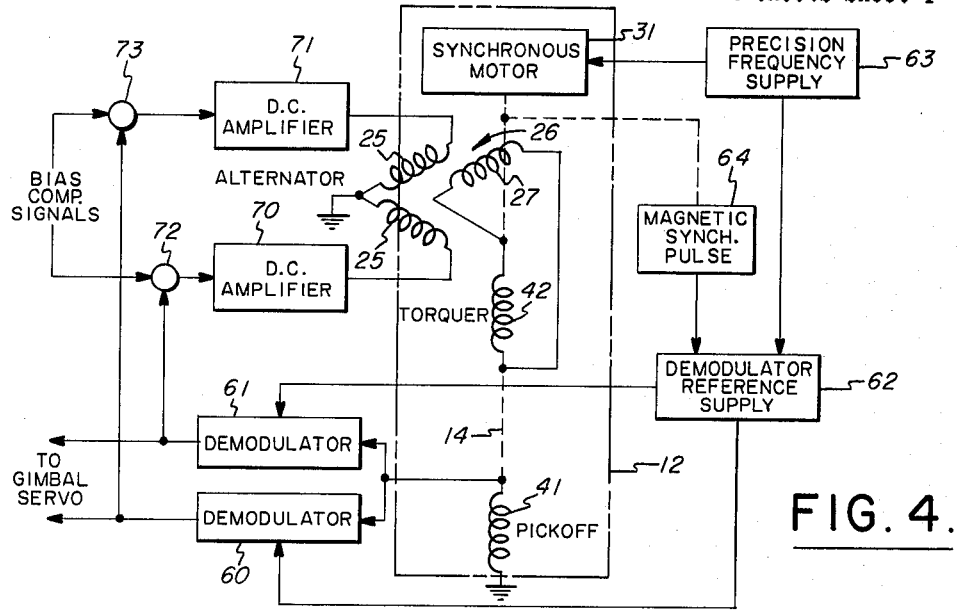
Figure 5:
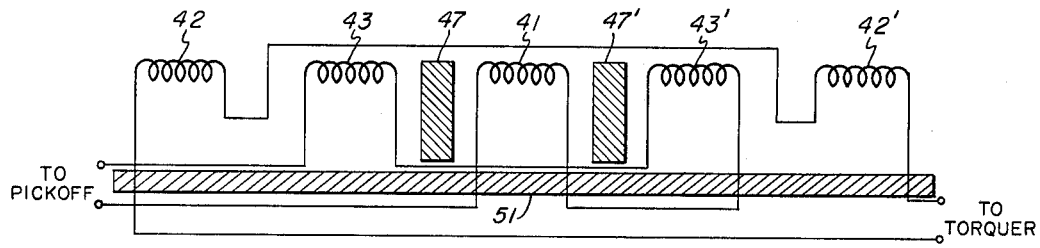
Figure 6:
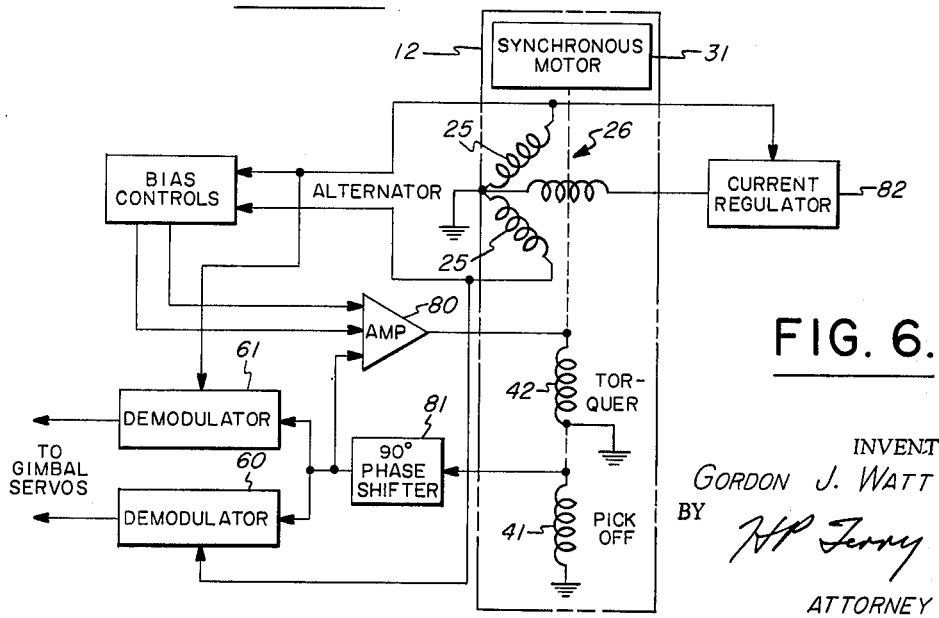

Referring now to the drawings:

FIG. 1 is an elevation view in section of a ball gyroscope incorporating the present invention, FIG. 2 is an enlarged perspective view partly in section of the combined pick-off and torquing device shown in FIG. 1, FIG. 3 is an enlarged view in section of one side of the combined pick-off and torquing device shown in FIG. 1, FIG. 4 is a schematic wiring diagram showing one application of the present invention, FIG. 5 is a schematic wiring diagram of the combined pick-off and torquing device of FIG. 1, and FIG. 6 is a schematic wiring diagram showing another application of the present invention.

Referring now to FIG. 1, a ball gyroscope 10 is shown having a stationary housing 11 adapted to be secured, for example, to a navigable craft. A rotatable universal bearing 12 having a spherical cavity 13 is adapted to rotate within the housing 11 around an axis 14 defined by spaced ball bearings 15 and 16. A spherical gyroscopic rotor or sensitive element 20 in the shape of a ball is adapted to spin within the spherical cavity 13 around a spin axis 21 that is normally coincident with the axis of rotation 14 of the rotatable bearing 12.

The stationary housing 11 includes a generator housing 22, a bearing housing 23 and a motor housing 24. The generator housing 22 supports the stator 25 of a generator 26 while the rotor 27 thereof is mounted on the upper shaft 28 of the rotatable bearing 12 for rotation therewith. The motor housing 24 supports the stator 30 of a motor 31 and its rotor 32 is mounted on the lower shaft 33 of the bearing 12 for rotation therewith. The motor housing 24 contains magnetic shielding 34 to prevent interaction between motor flux and the remainder of the gyroscope 10. Similarly, the generator housing 22 contains magnetic shielding 35 for the same purpose.

The motor 31 drives the rotatable bearing 12 around the axis 14 and the rotor 20 in turn is pneumatically supported within the spherical cavity 13 to provide a mechanical configuration which may be considered as a rotor within a rotor. Air for supporting and rotating the spherical sensitive element 20 is admitted through conduits 36 and 36' in the housing 11 and transmitted through conduits 37 to the interior of the spherical cavity 13.

A plurality of support pads 38 are uniformly distributed within the cavity 13 and mounted upon the bearing 12 in order that their spherical faces 39 which are all of the same radius have a common center on the axis of rotation 14. During operation of the ball gyroscope 10, the ball 20 is supported normally with its center coincident with the common center of the pad faces 39. The forces that support the ball 20 are due to pressure centers created by air flow from orifices 29 at the center of each pad face 39 which creates a pressure center between respective pad faces 39 and the surface of the ball 20. The pressure centers act like linear springs and support the ball 20 in stable equilibrium.

The gyroscope 10 further includes electromagnetic elements which implement the functions of detecting the direction of the momentum or spin axis 21 of the ball 20, of precessing the spin axis 21 of the ball 20, and of spinning the air bearing 12 and the ball 20. The combined electromagnetic pick-off and torquer 40 includes pick-off, torquing and decoupling coils 41, 42, 42' and 43, 43' respectively. The pick-off and torquing coils 41 and 42, 42' are cooperative with a bar magnet 44 disposed within the ball 20 and extending therethrough. The material from which the ball 20 is made is non-conductive as possible to prevent hysteresis and eddy current coupling to external electromagnetic fields.

Referring to FIGS. 1, 2 and 3, the pick-off, torquing and decoupling coils 41, 42, 42' and 43, 43' respectively define planes which are normal to the axis of rotation of the air bearing 12 upon which they are mounted. Their relative positions are determined by the geometry of the annular spaced soft iron shielding rings 47 and 47' associated therewith in a manner to be explained. The pick-off and decoupling coils 41 and 43, 43' respectively are so arranged and the configuration of the air gaps 45 and 45' in the respective diametrically opposed pairs of salient pole pieces 46 and 46' respectively is so chosen that the pick-off coil 41 is cut by a maximum of flux while the decoupling coils 43, 43' are cut by a minimum of the flux generated by the magnet 44. Further, the pick-off and decoupling coils 41 and 43, 43' respectively are so wound and connected and the configuration of the shielding rings 47 and 47' is so chosen that the mutual inductance between the pick-off and decoupling coils 41 and 43, 43' respectively and the torquing coils 42, 42' is zero. In addition, the magnetic pole pieces 46 and 46' are designed such that a minimum reluctance path exists for the flux emanating from the magnet 44 when its magnetic poles are aligned with the pole pieces 46 and 46' in a plane normal to the axis of rotation 14 of the air bearing 12. At the same time the design of the pole pieces 46, 46' is such that a constant reluctance path for the flux of the magnet 44 exists throughout a symmetrical region of rotation of the magnetic axis of the magnet 44 out of a plane normal to the air bearing axis of rotation 14.

As shown more clearly in the enlarged views of FIGS. 2 and 3, the pick-off 48 comprises a pick-off coil 41 mounted on the bearing 12 in the equatorial plane of the ball 20, the two pairs of pole pieces 46 and 46', a high permeability ferromagnetic hollow cylinder 51 surrounding the pick-off coil 41, and the permanent magnet 44 disposed within the ball 20. The pole pieces 46 and 46' and the cylinder 51 are mounted to rotate with the bearing 12 and cooperate with the magnet 44 to define the magnetic flux path around the pick-off coil 41 in a manner to be explained. The pick-off coil 41 passes through the two pairs of salient pole pieces 46 and 46'. Each pair of pole pieces 46 and 46' is mounted 180° apart on the bearing 12. As shown in FIG. 2, preferably the width of the pole pieces 46, 46' is substantially the same as that of the magnet 44 with which they cooperate. The pick-off coil 41 extends around the inner periphery of the bearing 12 within the cylinder 51.

When the spin axes 21 and 14 of the ball 44 and the bearing 12 respectively are aligned, the pick-off coil 41 and the magnet 44 are coplanar throughout each rotation and no pickoff output results. Should a spin axis angular offset be present, however, it is reflected in an equal offset of the plane of rotation of the magnet 44 with respect to that of the pick-off coil 41. When this happens, those portions of the coil 41 opposite the magnetic poles of the magnet 44 sweep back and forth past these magnetic poles, undergoing one cycle of oscillation for each rotation of the instrument 10. The interaction between the coil 41 and the magnet flux induces a sinusoidal E.M.F. in the pick-off coil 41. The amplitude of the E.M.F. is proportional to the error angle and, with correct loading on the pickoff output, the device is free of coercion tendencies.

By itself the pick-off output provides only a rotating vector quantity giving no indication of error direction and sense. To complete the error-detecting function of the pick-off 48, therefore, it is necessary to establish a reference voltage with which the pick-off signal can be compared in phase. The comparison establishes a phase angle between the pick-off signal and the reference which represents the angular coordinate of a pick-off output which is coded in polar form. As described in succeeding paragraphs, this output may either be used directly or it may be resolved into its orthogonal components. For either case, however, the primary rotational reference is provided by the alternator generator 26. As shown in FIG. 4 the alternator stator 25 has two phase windings disposed at right angles, permitting it to act as a resolving device which operates in synchronism with the rotating assembly 12. The location of the stator phase windings with respect to the housing 11 can be used to define a set of sensitive axes fixed to the stationary portions of the instrument 10.

The pick-off 48 is effectively a self-excited permanent magnet generator and provides a signal when there is misalignment between the rotor spin axis 21 and the normal to the plane of the pick-off coil 41, i.e., axis of rotation 14. Since this is also the source of viscous or eddy current coercion, the pick-off signal may be used to precisely detect and compensate coercion. The pick-off signal is synchronous with rotation of the magnet 44 and produces a signal proportional to spin axis misalignment suitable in a manner to be explained for servo control or direct feedback to the spaced torquing coils 42, 42'. The magnet 44 need not rotate precisely in the plane defined by the pick-off coil 41 since this misalignment produces no pick-off signal or coercion, as the pick-off 48 essentially detects only a difference in the alignment of the spin axes. Current is provided to the pick-off and decoupling coils 41 and 43, 43' through the slip ring and brush assembly 50.

The torquer 49 includes a pair of spaced torquing coils 42, 42', larger in diameter than the pickoff coil 41, but also symmetrically disposed about the equatorial plane of the ball 20. When excited with an A.C. current of the proper phase, the torquing coils 42, 42' couple with the magnet flux emanating from the magnet 44 in the ball 20 to produce a directed torque proportional to current amplitude. Coupling between the pickoff 48 and the torquer 49 is inhibited by the high permeability material shielding rings 47 and 47' and by the spaced compensation coils 43, 43' wound in series opposition with the pickoff coil 41, as shown in FIG. 5, which serve to null the component of pickoff output attributable to torquer excitation. The compensation coils 43, 43' located between the pickoff coil 41 and the torquing coils 42, 42' to minimize the effect of the torquing signal on the pick-off signal gradient.

Current is provided to the torquing coils 42, 42' from the alternator generator 26 which is arranged so that the amplitude and phase of the current in the torquing coils 42, 42' can be controlled in a manner to be explained. The magnet 44 reacts only to a magnetic field which has a component along the spin axis 21 and varies synchronously with rotation. If the peak amplitude of the oscillating field is proportional to the speed of rotation, precession of the ball 20 will be unaffected by rotational speed but only by amplitude. The direction of precession is controlled by the phase of the field relative to the magnet 44. Since rotation of the ball 20 is made synchronous with the bearing housing 12 by means of the pole pieces 46, 46', the bearing housing 12 may be used as a phase reference source. The resolver generator 26 by having its rotor 27 connected to the bearing housing 12 and its stator 25 mounted on the housing 11 therefore provides a phase reference as well as a source of current which is proportional to the speed of rotation, independent of supply frequency and also provides a source of synchronous current to the torquer coils 42, 42' which are concentric with the pick-off coil 41.

The phase and amplitude of the signal from the generator 26 may be controlled by vector resolution of the D.C. excitation currents in the two orthogonal field windings on the stator portion 25 of the resolver generator 26. Since the armature 27 of the resolver generator 26 is carried by the rotating bearing 12, no slip rings are required. Phase control may also be obtained by rotating the stator 25 of the resolver generator 26 relative to the gimbal system. In this case, only one stator winding is required. This device is also a modulator and thus provides frequency decoupling which is useful for feedback from the pick-off coil 41 to the torquer coils 42, 42'.

Since the pick-off and torquer coils 41 and 42, 42' respectively are concentric, mutual inductive coupling exists between them. This is not serious with respect to the pick-off signal coupling back into the torquer coils 42, 42', however, the current in the torquer coils 42, 42' will produce an undesirable signal in the pick-off coil 41. Compensation is provided by decoupling or compensation coils 43, 43' which are inductively coupled to the torquer coils 42, 42'. The compensating coils 43, 43' are connected in phase opposite with the pick-off coil 41 thereby compensating for the undesirable signal in the pick-off coil 41. Since these are induced voltages, compensation is not effected by impedance changes due to temperature or frequency.

The pole pieces 46, 46' tend to cause the magnet 44 in the rotor 20 to become aligned therewith in order to maintain a minimum reluctance path for the magnetic flux. This serves two functions (1) it causes the rotor 20 to spin synchronously with the bearing 12, and (2) it causes the magnet 44 to lie in the plane of the pick-off coil 41. If the magnet 44 lies slightly outside this plane, it is inconsequential since a pick-off signal only results from misalignment from the spin axis 21 with respect to the axis 14. Once the rotor 20 is pneumatically floated, it seeks the minimum reluctance path and thus may be brought up to speed synchronously by means of the pole pieces 46, 46'.

In operation, compressed air is applied to the conduits 36 and 36' and thus to the support pads 38 via conduits 37 and orifices 29. The air flow maintains the pressure centers which support the ball 20.

The motor 31 spins the air bearing 12 in synchronism with the frequency of power supplied to the stator 30. Viscous drag forces torque the ball 20 about the air bearing spin axis 14. When the ball spin velocity is nearly that of the air bearing 12, the magnet 44 locks into alignment opposite the pole pieces 46, 46'. Coercion of the ball 20 due to this locking action is about the air bearing spin axis 14 only, and there is no coercion within a range of rotation of the ball spin axis 21 out of alignment with the air bearing spin axis 14. Thus, when transients due to initial spinup have died, the ball 20 is a free gyro wheel except for some small coercion effects at spin frequency which are averaged to zero. Among effects which move with the air bearing 12 and therefore have a zero net effect over a cycle of rotation, are turbining in the air bearing, magnetic fields along the spin axis, and the effects of thermal gradient through the ball gyro structure 10.

The magnitude and direction of the angle between the air bearing spin axis 14 and the inertially fixed direction of the ball spin axis 21 are determined by the amplitude and phase of the voltage generated in the pick-off coil 41 by the magnet 44. This voltage appears at the output terminal of the brush and slip ring assembly 50.

The pick-off output, when compared in phase with an apropriate reference voltage at the same frequency, appears as an error signal coded in polar coordinates. This signal may be used directly or it may be resolved depending for example, whether an attenuator-torquing or a direct torquing mode of operation is desired.

The alternator torquing mode of operation is illustrated in FIG. 4 which indicates a requirement for resolution of the pick-off output by means of two phase-sensitive demodulators 60 and 61. The reference voltages for resolution are provided by a demodulator reference supply 62, which, operating from the precision frequency-controlled motor supply 63, is keyed to reflect dynamic changes in the power angle between the stator 30 of the motor and its rotor 32. Keying is provided by a pulse originating in a magnetic circuit 64 which is triggered once in each rotation of the instrument 10.

In the table servo mode, the demodulated orthogonal components of the pick-off output feed directly into gimbal servo-amplifiers as indicated by the legend. Sensitive axis definition is provided by properly orienting the magnetic pulse circuitry 64 with respect to the location of the gimbal servo axes.

In the torque feedback mode, the output of the alternator rotor drives the torquer 42 directly. Proper phase control is provided by D.C. current amplifiers 70 and 71 which, operating off the pick-off demodulators 60 and 61 respectively, separately excite each winding of the alternator stator 25 an proportion to the appropriate pick-off signal component. Summing points 72 and 73 are provided to permit external torque bias compensation to be superimposed on the feedback signals.

To correct for the 180 degree uncertainty of magnet orientation following restart, a simple phase-sensing circuit (not shown) may be provided with a capacitance bridge, capacitive plates located on the ball and on the rotating bearing and a relay. In the event of a magnet reversal, the bridge unbalance will operate the relay to reverse the phasing of the demodulator reference leads.

The direct torquing mode of operation is shown in FIG. 6. This configuration utilizes the unresolved and unrectified pick-off output directly to drive the torque feedback amplifier 80. The only component between the output of the pick-off 48 and the input of the torque feedback amplifier 80 (other than normal filters required to reduce the components of pickoff noise attributable to slipping contacts and harmonic distortion which are not shown) is a 90 degree phase-shifting network 81. This phase shift reflects the orthogonal relationship between gyroscopic input and output parameters. The amplifier 80 itself is also capable of accepting programed torque bias compensation signals.

In the table servo mode, the operation of the instrument 10 is basically similar to that described under the alternator torquing mode. The only difference is the fact that the reference voltages required for error signal resolution are derived from the stator windings 25 of the self-excited alternator 26. The alternator excitation is held constant by a current regulator 82 so that the reference outputs can also be used for precision phase control of external sources of A.-C. precession signals.

Precession of the momentum or spin axis 21 of the ball 20 is accomplished by the interaction of the magnet 44 and a magnetic field due to current in the torquer coil 43. Only an A.C. field synchronous with the air bearing rotation will have a net effect on the direction of the spin axis 21. The direction and rate of precession depends upon the strength and phase of this field.

When the bearing and ball spin axes 14 and 21 respectively are not coincident, viscous forces in the air bearing 12 coerce the ball 20 in such a manner that the spin axes 14 and 21 tend to return to alignment. The ball 20 may be decoupled from this viscous coercion by applying an equal and opposite torque with the torquer coils 42, 42'. This may be accomplished by including the pick-off and torquer coils 41 and 42, 42' respectively in a closed feedback loop.

Although the phase reference has been described as derived from the alternator generator 26, it will be appreciated that alternatively it may be derived optically, magnetically or electrostatically. It will be noted that the phase reference derivation arrangement disclosed in the preceding paragraphs is independent of the supply frequency.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In gyroscopic apparatus of the type having an inertial element rotatably supported for spinning about an axis within a member, (1) first and second diametrically opposed peripheral portions of said inertial element being magnetized normal to said spin axis, (2) pick-off means having an annular pick-off coil mounted on said member and cooperative with said magnetized portions of said element for providing a signal in accordance with the deviation of said spin axis of said element from a predetermined orientation, (3) torquing means cooperative with said magnetized portions of said element and having annular spaced torquing coils mounted on said member for applying a torque to said inertial element, said torquing coils and said pick-off coils being disposed in close proximity with respect to each other tending to cause undesirable interaction therebetween, and (4) compensation means including annular compensating coils connected to said pick-off coil and disposed intermediate said torquing coils and said pick-off coil and mounted on said member for preventing interaction of said torquing means and said pick-off means.

2. In gyroscopic apparatus of the type having an inertial element rotatably supported for spinning about an axis within a rotatable bearing adapted for rotating within a housing, (1) first and second diametrically opposed peripheral portions of said inertial element being magnetized normal to said spin axis, (2) pick-off means having an annular pick-off coil encircled by a hollow ferromagnetic cylinder mounted on said rotatable bearing and cooperative with said magnetized portions of said element for providing a signal in accordance with the deviation of said spin axis of said element from a predetermined orientation, (3) torquing means cooperative with said magnetized portions of said element and having annular spaced torquing coils mounted on said rotatable bearing for applying a torque to said inertial element, said torquing coils and said pick-off coils being disposed in close proximity with respect to each other tending to cause undesirable interaction therebetween, and (4) compensation means including annular compensating coils connected to said pick-off coils and annular shielding rings both disposed intermediate said torquing coils and said pick-off coil and mounted on said rotatable bearing for preventing interaction of said torquing means and said pick-off means.

3. In gyroscopic apparatus of the type having a spherical sensitive element universally supported for spinning about an axis within a spherical cavity in a rotatable bearing means mounted for rotation around an axis within a housing, said spherical sensitive element having a spin axis that is normally aligned with said bearing axis of rotation, (1) said sensitive element having first and second diametrically opposed peripheral portions oppositely magnetized normal to its spin axis, (2) pick-off means having first and second diametrically opposed pole pieces disposed in said spherical cavity and cooperative with said first and second magnetized portions of said sensitive element and an annular pick-off coil cooperative with said pole pieces and said magnetized portions for providing a signal in accordance with the deviation of said spin axis from a predetermined orientation, (3) torquing means including spaced annular torquing coils cooperative with said first and second magnetized portions of said sensitive element and mounted on said rotatable bearing for applying a torque to said spherical sensitive element in a direction to return said spin axis to said predetermined orientation, said pick-off and torquing coils being disposed in close proximity with respect to each other tending to cause undesirable interaction therebetween, and (4) compensation means including annular compensating coils connected to said pick-off coils and annular shielding rings both disposed intermediate said torquing coils and said pick-off coil for preventing said interaction between said torquing means and said pick-off means.

4. In gyroscopic apparatus as recited in claim 3, wherein said pick-off, torquing and compensation coils are synchronous and the planes of all said coils and said shielding rings are normal to the axis of rotation of said bearing means, and said pick-off and compensation coils are serially connected in phase opposition.

5. In gyroscopic apparatus as recited in claim 3 in which said pick-off means further includes first and second pairs of pole pieces cooperative with said first and second magnetized portions of said sensitive element for forming minimum reluctance paths when opposite said magnetized portions and for magnetically locking said sensitive element to said bearing means for synchronous rotation therewith.

6. In gyroscopic apparatus as recited in claim 3 further including A.C. generator means responsive to the rotation of said bearing means for providing a phase reference voltage synchronized with said rotation and independent of electrical supply frequency variations.

7. In gyroscopic apparatus as recited in claim 3 further including resolver generator means having a single phase winding mounted for rotation with said rotatable bearing and two phase windings mounted on said housing for providing a phase reference synchronized with the rotation of said element for said pick-off and torquing means that is independent of electrical supply frequency variations.

8. In gyroscopic apparatus as recited in claim 3 further including a resolver generator having a single phase rotor winding mounted for rotation with said rotatable bearing and stator two phase windings mounted on said housing for providing a phase reference voltage, and said pick-off means further including first and second pairs of pole pieces cooperative with said first and second magnetized portions of said sensitive element respectively for forming minimum reluctance paths when opposite said magnetized portions and for magnetically locking said sensitive element to said bearing means for synchronous rotation therewith.

9. In gyroscopic apparatus of the type having a spherical inertial element universally supported within a spherical cavity in a rotatable bearing means mounted for rotation around an axis within a housing, said spherical inertial element having a spin axis that is normally aligned with said bearing axis of rotation, (1) oppositely magnetized first and second diametrically opposed peripheral portions of said inertial element being disposed in a plane normal to said spin axis, (2) pick-off means including an annular pick-off coil encircled by a hollow ferromagnetic cylinder and both cooperative with first and second diametrically opposed pole pieces disposed in said spherical cavity which are cooperative with said first and second magnetized portions of said element for providing a signal in accordance with the deviation of said spin axis from said bearing axis of rotation, (3) torquing means including spaced annular torquing coils cooperative with said first and second magnetized portions of said element and mounted on opposite sides of said pick-off coil on said rotatable bearing for applying a torque to said element in a direction tending to return said spin axis to said bearing axis, said pick-off and torquing coils being disposed in close proximity with respect to each other tending to cause undesirable interaction therebetween, (4) compensation means including annular compensating coils connected to said pick-off coils and annular shielding rings both disposed intermediate said torquing coils and said pick-off coil for preventing said interaction between said torquing means and said pick-off means, (5) resolver generator means having its stator mounted on said housing and its rotor rotatable with said rotatable bearing means for providing a phase reference voltage for said pick-off signal, and (6) means for rotating said rotatable bearing means.

10. In gyroscopic apparatus as recited in claim 9, wherein said pick-off, torquing and compensation coils are synchronous and the planes of all said coils and said shielding rings are normal to the axis of rotation of said bearing means, and said pick-off and compensation coils are serially connected in phase opposition.

11. In gyroscopic apparatus as recited in claim 9 in which said pick-off means further includes first and second pole pieces cooperative with said first and second magnetized portions of said sensitive element respectively for forming minimum reluctance paths when opposite said magnetized portions and magnetically locking said sensitive element to said bearing means for synchronous rotation therewith.

12. In gyroscopic apparatus as recited in claim 9 in which said resolver generating means has its rotor connected to said torquer means and its stator connected to said pick-off means.

13. In gyroscopic apparatus as recited in claim 12 further including sensitive demodulator means connected between said pick-off means and the stator winding of said resolver generator means and demodulator reference supply means connected to said phase sensitive demodulator means for providing a reference voltage synchronized with the rotation of said rotatable bearing means.

References Cited by the Examiner
UNITED STATES PATENTS

| | | | |
|---|---|---|---|
| 1,986,807 | 1/1935 | Gillmor | 33—226 |
| 2,785,573 | 3/1957 | Bentley | 74—5 |
| 2,850,905 | 9/1958 | Sedgfield | 74—5.7 |
| 2,866,146 | 12/1958 | Rodriguez | 318—489 |
| 2,913,907 | 11/1959 | Sedgfield | 74—5.41 |
| 2,948,813 | 8/1960 | Osborne | 250—203 |
| 2,960,873 | 11/1960 | Lundberg | 74—5 |

BROUGHTON G. DURHAM, *Primary Examiner.*

SAMUEL FEINBERG, *Examiner.*

R. F. STAHL, *Assistant Examiner.*